(12) United States Patent
Backhus et al.

(10) Patent No.: US 11,243,937 B2
(45) Date of Patent: Feb. 8, 2022

(54) LOG ANALYSIS APPARATUS, LOG ANALYSIS METHOD, AND LOG ANALYSIS PROGRAM

(71) Applicant: Hitachi, Ltd., Tokyo (JP)

(72) Inventors: Jana Backhus, Tokyo (JP); Yosuke Himura, Tokyo (JP); Mineyoshi Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 207 days.

(21) Appl. No.: 16/568,311

(22) Filed: Sep. 12, 2019

(65) Prior Publication Data

US 2020/0242100 A1 Jul. 30, 2020

(30) Foreign Application Priority Data

Jan. 24, 2019 (JP) .............................. JP2019-010359

(51) Int. Cl.
*G06F 7/00* (2006.01)
*G06F 16/00* (2019.01)
*G06F 16/23* (2019.01)
*G06F 16/2455* (2019.01)

(52) U.S. Cl.
CPC ...... *G06F 16/2358* (2019.01); *G06F 16/2379* (2019.01); *G06F 16/24568* (2019.01)

(58) Field of Classification Search
None
See application file for complete search history.

(56) References Cited

U.S. PATENT DOCUMENTS

| 9,779,005 | B2 | 10/2017 | Gukal et al. | |
|---|---|---|---|---|
| 2008/0071736 | A1* | 3/2008 | Smith | G06F 16/21 |
| 2015/0347562 | A1* | 12/2015 | Edalia | G06N 3/088 |
| | | | | 707/739 |
| 2017/0132104 | A1* | 5/2017 | Liu | G06F 11/3438 |

* cited by examiner

*Primary Examiner* — Tuan A Pham
(74) *Attorney, Agent, or Firm* — Mattingly & Malur, PC

(57) ABSTRACT

A log labeling apparatus is configured to include a label importance DB and a similarity DB configured to store importance information between a plurality of labels and an action set and action set information identifying a first action set for calculating a second similarity with each label of a first log unit, a similarity calculation unit configured to calculate the second similarity with each label of the first log unit on the basis of the importance information, an action set of the first log unit, and the action set of the action set information, a post processor configured to detect label candidates, and an accumulation determination unit configured to determine a second action set for calculating a second similarity of a second log unit and to store action set information on the second action set in the similarity DB.

11 Claims, 15 Drawing Sheets

Prepared log data 108

Prepared log data 108-1 (acquired from data with log event label)

| Device ID (D10801) | Action set ID (D10802) | Action (D10803) | Start time (D10804) | End time (D10805) | Label ID (D10806) | Log event entity ID (D10807) |
|---|---|---|---|---|---|---|
| 1 | 1 | {1,2,3} | 10:30:01 | 10:31:05 | 2 | 1ad93 |
| 1 | 4 | {1,5,9} | 10:31:45 | 10:34:33 | 2 | 1ad93 |
| 1 | 2 | {1,3,7,8,9} | 10:45:09 | 10:47:55 | 2 | 1ad93 |
| ... | ... | ... | ... | ... | ... | ... |

Prepared log data 108-2 (acquired from log stream data)

| Device ID (D10801) | Action set ID (D10802) | Action (D10803) | Start time (D10804) | End time (D10805) | Label ID (D10806) | Log event entity ID (D10807) |
|---|---|---|---|---|---|---|
| 5 | 7 | {1,2} | 10:30:16 | 10:30:25 | NaN | NaN |
| 5 | 5 | {5,6,8,4} | 10:32:04 | 10:33:17 | NaN | NaN |
| ... | ... | ... | ... | ... | ... | ... |

Fig. 3

Label occurrence DB 104

Main table 201

| Label ID (D20101) | Occurrence count table (action) 202-a (D20102) | Occurrence count table (action set) 202-b (D20103) | Total label document count (D20104) | |
|---|---|---|---|---|
| 1 | Table 202-1a | Table 202-1b | 5 | 202-1 |
| 2 | Table 202-2a | Table 202-2b | 2 | 202-2 |
| 3 | Table 202-3a | Table 202-3b | 1 | 202-3 |
| 4 | Table 202-4a | Table 202-4b | 12 | 202-4 |
| 5 | Table 202-5a | Table 202-5b | 3 | 202-5 |
| ... | ... | ... | ... | |
| N | Table 202-Na | Table 202-Nb | 3 | 202-N |
| Whole | Table 202-Oa | Table 202-Ob | Total (1:N) | 202-O |

Sub-table 202

Occurrence count table (action) 202-a
Table 202-1a

| Action ID (D20201) | Total occurrence count (D20202) | Occurrence document count (D20203) |
|---|---|---|
| 1 | 5 | 5 |
| 2 | 20 | 5 |
| 3 | 6 | 5 |
| 4 | 12 | 5 |
| 5 | 19 | 5 |
| 6 | 13 | 5 |

Occurrence count table (action set) 202-b
Table 202-1b

| Action set ID (D20204) | Action set (non-ordered) (D20205) | Total occurrence count (D20206) | Occurrence document count (D20207) |
|---|---|---|---|
| 1 | 1 2 3 | 5 | 5 |
| 2 | 2 3 4 | 1 | 1 |
| 3 | 2 4 5 | 6 | 5 |
| 4 | 2 5 6 | 8 | 5 |
| 5 | 4 5 6 | 5 | 5 |
| 6 | 7 8 9 | 0 | 0 |

Fig. 5

Label importance DB 105

Action set table 301

| | D30101 | D30102 | D30103 | D30104 | ... | D3010N |
|---|---|---|---|---|---|---|
| | Action set ID | Action set (non-ordered) | Label 1 importance | Label 2 importance | ... | Label N importance |
| | 1 | 1 2 3 | 1 | 0 | ... | 0 |
| | 2 | 2 3 4 | 0.1667 | 1 | ... | 0 |
| | 3 | 2 4 5 | 0.857 | 0.1 | ... | 0 |
| | 4 | 2 5 6 | 0.6 | 0 | ... | 0 |
| | 5 | 4 5 6 | 1 | 0 | ... | 0 |
| | 6 | 2 4 6 | 0.1667 | 1 | ... | 0 |

Action table 302

| | D30201 | D30202 | D30203 | ... | D3020N |
|---|---|---|---|---|---|
| | Action ID | Label 1 importance | Label 2 importance | ... | Label N importance |
| | 1 | 1 | 0 | ... | 0 |
| | 2 | 0.24 | 0.5 | ... | 0 |
| | 3 | 0.857 | 1 | ... | 0 |
| | 4 | 0.4 | 0.6 | ... | 0 |
| | 5 | 0.26 | 0.3 | ... | 0 |
| | 6 | 0.35 | 1 | ... | 0 |

Fig. 7

Similarity DB 107

Main table 401

| Device ID | Sub-table (time step t) D40101 | Sub-table (time step t-1) D40102 | ... D40103 | Sub-table (time step t-n) D4010N |
|---|---|---|---|---|
| 1 | Table 402-1a | Table 402-1b | ... | Table 402-1n |
| 2 | Table 402-2a | Table 402-2b | ... | Table 402-2n |
| 3 | Table 402-3a | Table 402-3b | ... | Table 402-3n |
| 4 | Table 402-4a | Table 402-4b | ... | Table 402-4n |
| 5 | Table 402-5a | Table 402-5b | ... | Table 402-5n |
| ... | ... | ... | ... | ... |
| N | Table 402-Na | Table 402-Nb | ... | Table 402-Nn |

Sub-table 402-1a to Nn

| Label ID D40201 | First similarity D40202 | Second similarity D40203 | Accumulated action set ID D40204 | Used similarity D40205 |
|---|---|---|---|---|
| 1 | 0.3 | 0.5 | {1, 4, 5} | 0.5 |
| 2 | 0.2 | 0.2 | {5} | 0.2 |
| 3 | 0 | 0 | {} | 0 |
| 4 | 0 | 0 | {} | 0 |
| 5 | 0 | 0 | {} | 0 |
| ... | ... | ... | ... | ... |
| N | 0 | 0 | {} | 0 |

LOG ANALYSIS APPARATUS, LOG ANALYSIS METHOD, AND LOG ANALYSIS PROGRAM

CROSS-REFERENCE TO PRIOR APPLICATION

This application relates to and claims the benefit of priority from Japanese Patent Application No. 2019-10359 filed on Jan. 24, 2019, the entire disclosure of which is incorporated herein by reference.

BACKGROUND

The present invention relates to a technique for analyzing labels indicating contents of events in log stream data composed of log data output consecutively.

DESCRIPTION OF THE RELATED ART

In recent years, there has been an increasing interest in improving the reliability, availability, and security of IT systems in the automatization of IT operation management. Main tasks in the IT operation management include monitoring and maintaining the health of IT systems, and tasks are currently conducted by human operators (monitoring operators).

The monitoring operators are obliged to monitor and interpret a log stream output generated by IT systems for indicating the current soundness status of the IT systems or events of operations, for example, a change of system configuration during maintenance. When the soundness of the IT systems is endangered, the monitoring operators need to take measures.

In recent years, the number of IT systems has been steadily increasing in an organization, and, for example, use of large entities of the IT systems such as data centers has been gradually becoming common. This leads to a large amount of log stream output which is generated by a large number of IT systems and all of which the monitoring operators need to analyze. To interpret all the log data generated by the IT systems requires a huge amount of labor and expense.

Most of the log stream output results from activities that are performed to improve (maintain) the system health and that do not require strict observation by the monitoring operators because further measures are not taken.

Although strict observation is not required, it remains important to notify a root cause of a log event of the observing monitoring operators in an accurate and timely manner.

Therefore, an automatic log labeling apparatus will provide relief to work resources necessary to interpret a log stream output in known maintenance log events.

For example, U.S. Pat. No. 9,779,005 proposes an unsupervised method for analyzing similarity of log stream data by identifying similarity of log data including a specific term. Here, a log record is log stream data partitioned into a log group according to a certain freely definable constraint. Similarity is determined between log records including the same definition term and stored in a data structure for definition words.

Furthermore, U.S. Patent application No. 2017/0132104 proposes an unsupervised log analysis method for a distributed control system that identifies a set of low-level log operations with one operation intention from an operation history by a system operator. The set of low-level log operations is organized by more abstract high-level operations and the same high-level operation is clustered in order to obtain a low-level operation ordering rule probability in each high-level operation.

SUMMARY

For IT systems, their health status is the most important and affects many users, therefore it is subject to continuous monitoring by monitoring operators. Here, the monitoring operators must accurately identify the type and cause of log stream output in order to ensure that the health of IT systems is not endangered.

Although most of the log stream output is generated by log events that do not endanger the health of the IT systems, for example, by maintenance operation, the IT systems may often output a log stream that does not endanger the health of the IT systems but looks like an error. Even at such times, it is necessary to accurately identify in order to confirm that no fatal error has occurred.

Many log events include a plurality of operation steps that all generate a log stream output, and the time frame of one log event may span a longer period with a break inserted in between. While the log output is being streamed continuously during an actual event being in progress, the monitoring operators have to identify a log event.

Therefore, it is not feasible to wait for an end of the log event in order to identify a right log event label by the log analysis method.

In order to support the monitoring operators and guarantee the health of the IT systems, it is necessary to identify a log event from the log stream output in an accurate and timely manner.

When the same definition term is included, similarity information is obtained for different records of the log stream output. However, it is impossible to handle groups of log records for all event labels. Furthermore, regardless of whether to include defined terms, a cumulative approach cannot gradually calculate similarity between log records.

The technique disclosed in U.S. Patent Application No. 2017/0132104 handles order information on a set of low-level operations by clustering with the same operation intention. This is performed in an offline approach only, so it cannot be applied to the log stream output. Furthermore, the technique of U.S. Patent Application No. 2017/0132104 does not calculate similarity between an extracted high-level operation and a newly observed log output either cumulatively or by the offline approach.

The present invention has been made in view of the above circumstances, and its object is to provide a technique capable of appropriately recognizing labels indicating contents of log events included in a log stream output.

In order to achieve the above object, a log analysis apparatus according to one aspect is a log analysis apparatus for recognizing a label indicating a log event included in log stream data which is a plurality of pieces of log data output consecutively, comprising: a storage unit configured to store importance information indicating importance of a plurality of action sets each including one or more actions included in log data for a plurality of labels, and action set information identifying a first action set used for calculating a long-term similarity which is similarity in a long-term perspective with each label of a first log unit including one or more pieces of log data at a first time point; a similarity calculation unit configured to calculate the long-term similarity with each of the labels of the first log unit based on the importance information, an action set included in the first log unit at the first time point, and the action set identified by the action set information; a label detection processing unit configured to detect label candidates corresponding to the first log unit based on the long-term similarity; and an accumulation determination unit configured to determine a second action set which is an action set used for calculating a long-term similarity with each label of a second log unit at a time point next to the predetermined time point based on the long-term similarity and to store action set information identifying the second action set in the storage unit.

According to the present invention, it is possible to appropriately recognize labels indicating contents of log events included in a log stream output.

BRIEF DESCRIPTION OF THE DRAWINGS

FIG. 3 is a configuration diagram of prepared log data according to an embodiment;

FIG. 5 is a configuration diagram of a label occurrence database according to an embodiment;

FIG. 7 is a configuration diagram of a label importance database according to an embodiment;

FIG. 9 is a configuration diagram of a similarity database according to an embodiment;

DETAILED DESCRIPTION OF THE EMBODIMENT

Embodiments will be described with reference to the drawings. The embodiments described below do not limit the invention according to the claims or all of elements and their combinations described in the embodiments are not necessarily essential to solution means of the invention.

In the following description, information may be described in an expression of "AAA table" but information may be expressed in any data structure. That is, in order to indicate that information does not depend on a data structure, the "AAA table" can be called "AAA information."

In the following description, an action is a term indicating the content of an event in an IT system, and, for example, is used as description of part of a message line of log data describing the event in the IT system. The action is, for example, a term indicating a state change in log data generated when the state of the IT system is changed, or a term indicating an operation instructed by an operator in log data generated when the operation is instructed by the operator of the IT system.

An action set is a term indicating a set of one or more actions considered to be related (unified) to a predetermined operation on the basis of a certain condition (time constraint).

A log event means an event that generates a plurality of pieces of log data including actions (actions that occur in a certain operation in the IT system, for example, changing configuration of a device, changing coupling of a network, and the like) considered to be unified for a certain intention.

Figure 1:
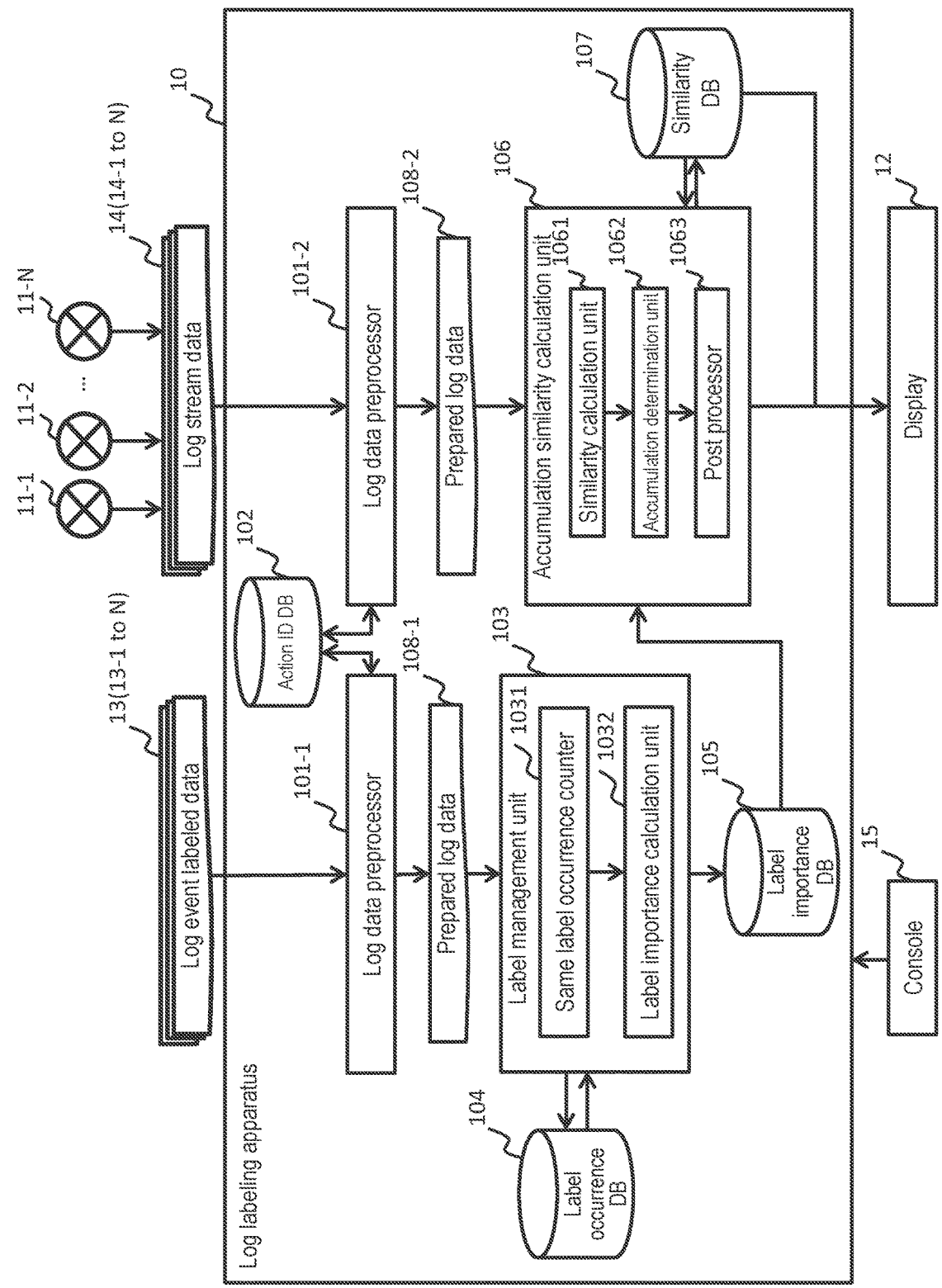
FIG. 1 is an overall configuration diagram of a computer system including a log labeling apparatus according to an embodiment.

FIG. 1 is an overall configuration diagram of a computer system including a log labeling apparatus according to an embodiment.

A computer system 1 includes a log labeling apparatus 10 as an example of a log analysis apparatus, one or more devices 11 (11-1 to 11-N), a console 15, and a display 12. The device 11 is a source that generates log data and consecutively transmits the generated log data. The device 11 may be comprised of hardware and may be comprised of software running on hardware, for example, like a VM (virtual machine). Alternatively, a plurality of devices 11 may be handled as one source. In the present embodiment, for convenience, the device 11 will be described using an example of one hardware device.

The display 12 is an output device that visualizes a screen of a GUI (Graphical User Interface) showing a processing result by the log labeling apparatus 10. The console 15 is an input device that receives execution of a management task for managing configuration of the log labeling apparatus 10, an operation input for the management task, and the like from an administrator of the log labeling apparatus 10.

The log labeling apparatus 10 receives two types of log data: log event labeled data 13 (13-1 to 13-N) and log stream data 14 (14-1 to 14-N). The log event labeled data 13 (learning log data) is log data to which a label indicating a log event (log event label, hereinafter also simply referred to as label) is attached and is used for training (learning) of the log labeling apparatus 10. The log event labeled data 13 is transmitted, for example, after a log event label pre-designated by the administrator or the like is attached to log data generated in a certain device 11. The log stream data 14 is a plurality of pieces of log data that are sequentially generated by the corresponding device 11 and transmitted consecutively, and a label is not attached. The log stream data 14 is data for which the log labeling apparatus 10 recognizes a label.

The log labeling apparatus 10 calculates similarity between the log stream data 14 and the log event labeled data 13, identifies label candidates for the log stream data 14 on the basis of the similarity, and causes the display 12 to display the calculated similarity, the identified label candidates, and the like.

The log labeling apparatus 10 includes a log data preprocessor 101 (101-1 and 101-2) as an example of a log data processing unit, an action ID database (DB) 102, a label management unit 103, a label occurrence DB 104, a label importance DB 105, and an accumulation similarity calculation unit 106, and a similarity DB 107.

The log labeling apparatus 10 has two phases of a training phase and a test phase in a teacher learning system.

The training phase will be described focusing on received one piece of log event labeled data 13. This does not mean that the log labeling apparatus 10 cannot simultaneously process a plurality of pieces of log event labeled data 13.

The log data preprocessor 101-1 uses action ID information from the action ID DB 102 for each piece of log event labeled data 13 to perform preprocessing on the log data, and outputs prepared log data 108-1.
Processing and the like by the log data preprocessor 101-1 will be described later with reference to FIGS. 2, 3, and 4.

The label management unit 103 executes processing for acquiring information on label occurrence (label occurrence information) and information on importance (importance information) from the prepared log data 108-1, stores the label occurrence information acquired by the processing in the label occurrence DB 104, and stores the importance information in the label importance DB 105.

The label management unit 103 includes a same label occurrence counter 1031 as an example of an occurrence counting unit and a label importance calculation unit 1032 as an example of an importance calculation unit.

The same label occurrence counter 1031 searches the prepared log data 108-1 for occurrence information, and adds it to entries (label entries) of the label occurrence DB 104. Further details of these will be described later with reference to FIGS. 5 and 6.

The label importance computer 1032 uses update information in the label occurrence DB 104 and thereby updates a label importance weight in the label importance DB 105. Further details of these will be described later with reference to FIGS. 7 and 8.

The test phase will be described focusing on one piece of log stream data 14 received by the log labeling apparatus 10. This does not mean that the log labeling apparatus 10 cannot simultaneously process a plurality of pieces of log stream data 14.

The log data preprocessor 101-2 of the log labeling apparatus 10 uses information acquired from the action ID DB 102 for received each piece of log stream data 14 to process the log data, and outputs prepared log data 108-2.

The accumulation similarity calculation unit 106 determines accumulation and acquires the similarity information on the basis of the prepared log data 108-2, and stores a determined accumulation determination result and the acquired similarity information in the similarity DB 107.

The accumulation similarity calculation unit 106 includes a similarity calculation unit 1061, an accumulation determination unit 1062, and a post processor 1063 as one example of a label detection processing unit and a display processing unit. Further details of these will be described later with reference to FIGS. 9 and 10.

The similarity computer 1061 uses label information from the label importance DB 105, the prepared log data 108-2, and an action set based on past log data acquired from the similarity DB 107 and calculates similarity between each log event label and observed log stream data. Further details of these will be described later with reference to FIG. 11.

The accumulation determination unit 1062 uses similarity information on current and past log data stored in the similarity DB 107 and thereby determines whether accumulation of information on the prepared log data 108-2 in the similarity DB 107 will be continued or reset. Further details of these will be described later with reference to FIG. 12.

The post processor 1063 handles overall similarity information on all labels from the similarity DB 107 and recognizes a label that is most likely for the prepared log data 108-2. Further details of these will be described later with reference to FIG. 12.

Next, the action ID database 102 will be described.

Figure 2:
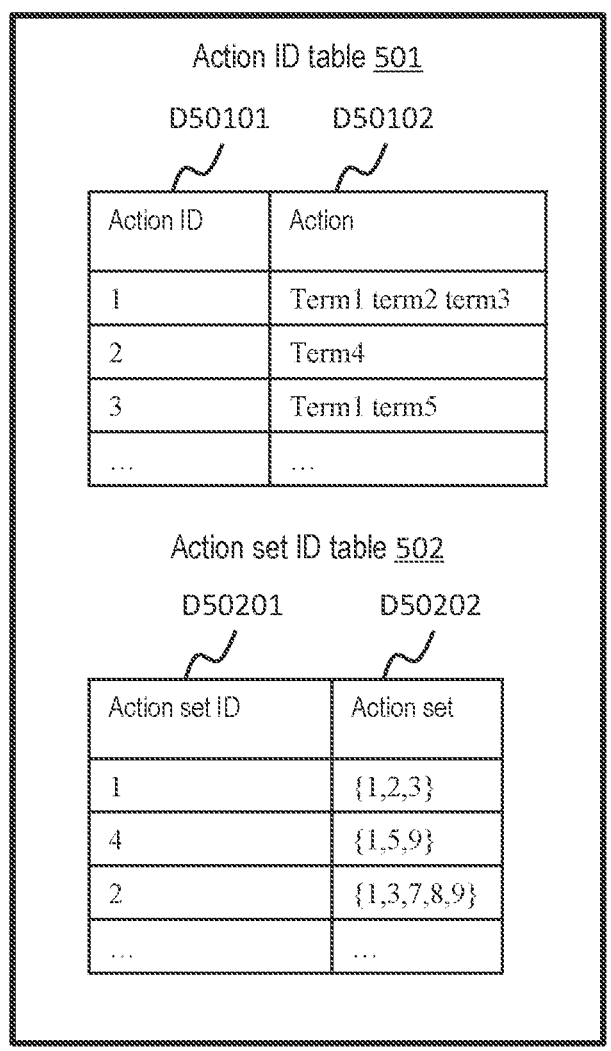
FIG. 2 is a configuration diagram of an action ID database according to an embodiment.

FIG. 2 is a configuration diagram of an action ID database according to an embodiment.

The action ID database 102 includes an action ID table 501 and an action set ID table 502.

The action ID table 501 stores an entry corresponding to each action. The entry of the action ID table 501 includes fields of an action ID D50101 and an action D50102.

The action ID D50101 stores identification information (action ID) that can uniquely identify an action.

The action D50102 stores terms indicating the action corresponding to the action ID of the action ID D50101 of the entry. The terms indicating the action may include one or more terms and spaces between the terms. The terms may include at least any one of numeric characters, alphanumeric characters, characters, or character strings used in log data.

The action set ID table 502 stores an entry (action set information) corresponding to an action set including a plurality of actions. In the example of FIG. 2, although an aggregation including a plurality of actions is registered as an action set, one action may be also registered as an action set. That is, an aggregation of one or more actions may be configured as an action set. An entry of the action set ID table 502 includes fields of an action set ID D50201 and an action set D50202.

The action set ID D50201 stores identification information (action set ID) that can uniquely identify an action set.

The action set D50202 stores action ID of actions included in the action set identified by the action ID corresponding to the entry. The action set may be one in which the order of actions is defined or one in which the order of actions is not defined. As the action ID included in the action set, the same action repeatedly executed may be included as one action ID, or the action ID may be included the number of times as many as being repeatedly executed.

FIG. 3 is a configuration diagram of prepared log data according to an embodiment.

The prepared log data 108 is data after the log data preprocessor 101 has processed raw log data which is the log event labeled data 13 or log stream data 14 as an input. The prepared log data 108-1 in FIG. 3 indicates data acquired using the log event labeled data 13 as an input, and the prepared log data 108-2 indicates data acquired using the log stream data 14 as an input.

An entry of the prepared log data 108 corresponds to, for example, one or more pieces of log data grouped into one action set, and includes fields of device ID D10801, action set ID D10802, action D10803, start time D10804, end time D10805, label ID D10806, and log event entity ID D10807.

The device ID D10801 stores identification information (device ID) that can identify a device 11 that has output log data. The action set ID D10802 stores an action set ID corresponding to an entry. The action D10803 stores action ID of actions included in an action set corresponding to the action set ID of the entry. The start time D10804 stores time (start time) at which observation of a log of the actions considered to be the action set corresponding to the entry has started. The end time D10805 stores time (end time) at which the observation of the log of the actions considered to be the action set corresponding to the entry has ended. The label ID D10806 stores label ID of a label corresponding to the entry. The log event entity ID D10807 stores identification information (log event entity ID) that can identify an entity of a log event corresponding to the entity. The log event entity ID allows different log events of the same label ID of the same device to be distinguished.

The prepared log data 108-1 is an example generated from the log event labeled data 13 during the training phase, and all the fields store information acquired from log event labeled data 13.

The prepared log data 108-2 is an example generated from the log stream data 14 during the test phase, and the label ID D10806 and the log event entity ID D10807 store NaN (Not a Number) indicating information is unavailable. The other fields of the entry excluding the fields of label ID D10806 and log event entity ID D10807 store information acquired from the log data of the log stream data 14.

Next, log data processing will be described.

Figure 4:
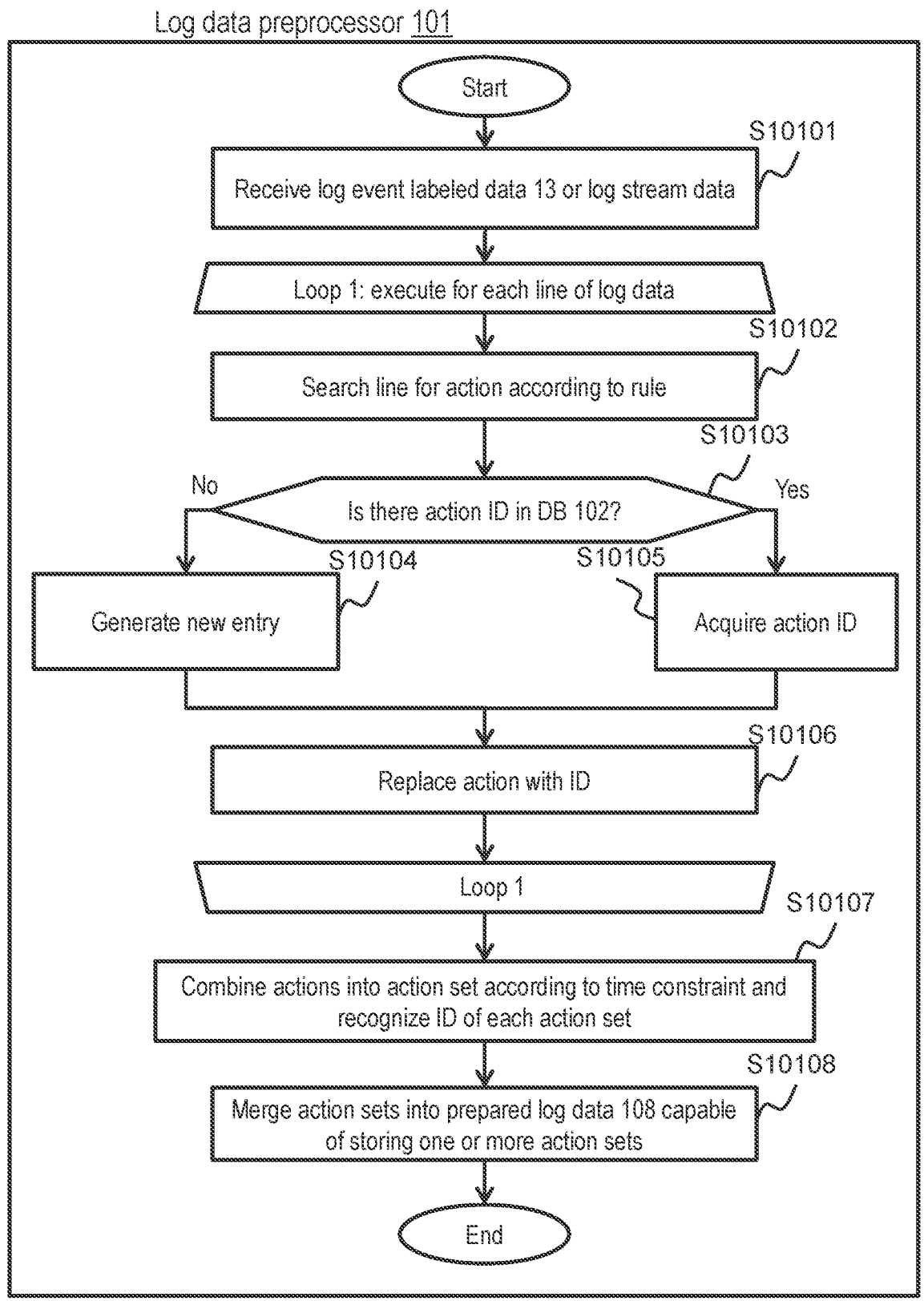
FIG. 4 is a flowchart of log data processing by a log data preprocessor according to an embodiment.

FIG. 4 is a flowchart of log data processing by a log data preprocessor according to an embodiment.

The log data preprocessor 101 receives one or more pieces of log data (log event labeled data 13 or log stream data 14) to be processed (S10101).

The log data preprocessor 101 then executes the processing of loop 1 (steps S10102-S10106) on each line (log line) of the received log data as a processing target.

In the loop 1, the log data preprocessor 101 searches a processing target log line for an action using a predetermined rule (S10102). Here, logs are classified into several format types, and the rule is a rule to identify a part describing an action from a log according to a format type of the log. The rule is, for example, that an action is in a third text part from the beginning in the log. The rule may be a regular expression (regex) rule or may be another rule.

The log data preprocessor 101 then determines whether a retrieved action is already registered with the action ID DB102 (S10103). As a result, when the retrieved action is not registered (S10103: No), the log data preprocessor 101 adds a new entry corresponding to the retrieved action to the action ID table 501 of the action ID DB102, adds action ID and a term of the action corresponding to the retrieved action to the added entry, and advances the processing to step S10106 (S10104).

On the other hand, when the retrieved action is registered (S10103: Yes), the log data preprocessor 101 acquires action ID corresponding to the retrieved action from the action ID table 501 of the action ID DB102 (S10105) and advances the processing to step S10106.

In step S10106, the log data preprocessor 101 replaces the retrieved action with the action ID newly added in step S10104 or the action ID acquired in step S10105 (S10106) and stores it (S10106).

The log data preprocessor 101 executes the processing of loop 1 on all of the log lines of the log data to be processed and then advances the processing to step S10107.

In step S10107, the log data preprocessor 101 uses time information of the log lines (information on time when each log is generated) and a time constraint rule to partition actions included in the one or more pieces of log data into action sets including one or more actions. Here, the time constraint rule is a constraint for creating a group (log unit) of target log data to be grouped into one action set from the log stream data 14, and, for example, it is a rule such as pieces of log data generated within a predetermined time are made to be the same log unit, or pieces of log data within a predetermined time for each predetermined time are made to be the same log unit. Note that this log unit is not necessarily a log event.

Each action set is identified by an action set ID acquired from the action set ID table 502 of the action ID DB102. If the action set ID is not stored in the action set ID table 502, the log data preprocessor 101 generates an entry of a new action set ID in the action set ID table 502.

The log data preprocessor 101 merges all the action sets acquired in step S10107 into one piece of prepared log data 108 including one or more action sets each including one or more actions (S10108).

Next, the label occurrence database 104 will be described.

FIG. 5 is a configuration diagram of a label occurrence database according to an embodiment.

The label occurrence DB 104 stores information (occurrence information) on occurrence of actions and an action set of a log corresponding to each log event label (also referred to as label).

The label occurrence DB 104 includes two types of tables of a main table 201 and a sub-table 202. The sub-table 202 includes two types of tables of an occurrence count table (action) 202-*a* and an occurrence count table (action set) 202-*b*.

The main table 201 stores an entry corresponding to each label. The entry of the main table 201 includes fields of label ID D20101, occurrence count table (action) D20102, occurrence count table (action set) D20103, and total label document count D20104.

The label ID D20101 stores identification information (label ID) that can identify a log event label corresponding to the entry. The occurrence count table (action) D20102 stores a pointer to the occurrence count table (action) 202-*a* managing an occurrence count of each action of the label corresponding to the entry. The occurrence count table (action set) D20103 stores a pointer to the occurrence count table (action set) 202-*b* managing an occurrence count of each action set of the label corresponding to the entry. The total label document count D20104 stores the total number of pieces of the log event labeled data 13 corresponding to each label.

The occurrence count table (action) 202-*a* includes a plurality of tables (202-1*a* to 202-N*a*, 202-O*a*, and the like). Each table (202-1*a* to 202-N*a*, 202-O*a*, and the like) stores an entry that manages the number of occurrence times of the action of each action ID in log event labeled data 13 (specific labeled data) to which a certain specific label is added. The entry of the table includes fields of action ID D20201, total occurrence count D20202, and occurrence document count D20203.

The action ID D20201 stores action ID of an action corresponding to the entry. The total occurrence count D20202 stores the total number of occurrence times of the action of the action ID corresponding to the entry in the specific labeled data. Here, the number of occurrence times includes a plurality of occurrence times when the action occurs the plurality of times in one piece of log event labeled data 13. The occurrence document count D20203 stores the number of pieces of log event labeled data 13 in which the action of the action ID corresponding to the entry has occurred.

The occurrence count table (action set) 202-*b* includes a plurality of tables (202-1*b* to 202-N*b*, 202-O*b*, and the like). Each table (202-1*b* to 202-N*b*, 202-O*b*, and the like) stores an entry that manages the number of occurrence times of the action set of each action set ID in log event labeled data 13 (specific labeled data) to which a certain specific label is added. The entry of the table includes fields of action set ID D20204, action set (non-ordered) D20205, total occurrence count D20206, and occurrence document count D20207.

The action set ID D20204 stores the action set ID of the action set corresponding to the entry. The action set (non-ordered) D20205 includes action ID of actions included in the action set of the action set ID corresponding to the entry in a non-ordered manner. When actions in the action set are ordered and managed, the field may include pieces of action ID according to the order of actions included in the action set.

The total occurrence count D20206 stores the total number of occurrence times of the action set of the action set ID corresponding to the entry in the specific labeled data. Here, when the action set occurs a plurality of times in one piece of log event labeled data 13, the number of occurrence times includes the plurality of occurrence times. The occurrence document count D20203 stores the number of pieces of log event labeled data 13 in which all actions included in the action set of the action set ID corresponding to the entry have occurred.

Next, occurrence count processing by the same label occurrence counter 1031 will be described.

Figure 6:
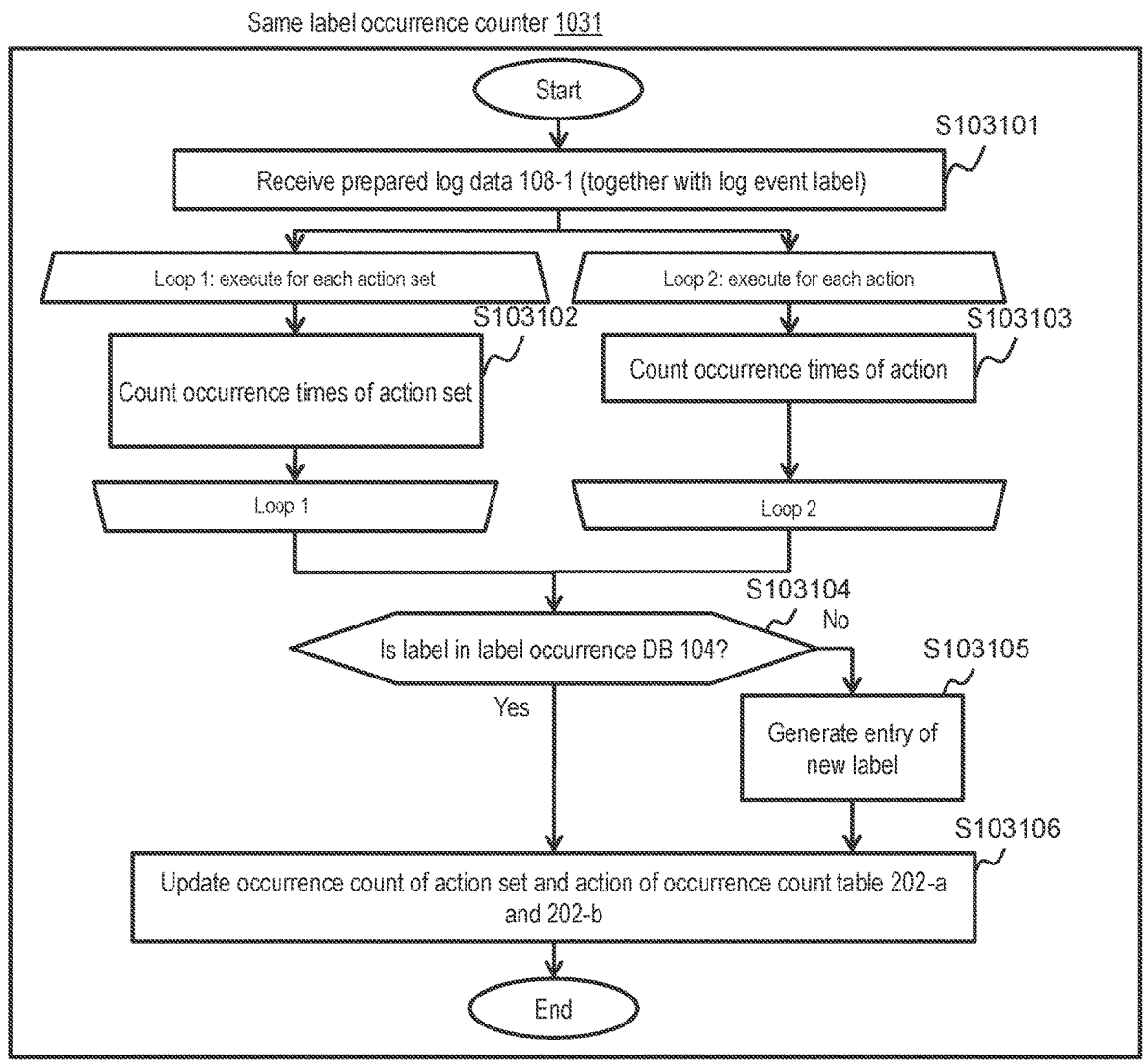
FIG. 6 is a flowchart of occurrence count processing by a same label occurrence counter according to an embodiment.

FIG. 6 is a flowchart of occurrence count processing by a same label occurrence counter according to an embodiment.

The same label occurrence counter 1031 receives the prepared log data 108-1 together with a log event label (S103101).

The same label occurrence counter 1031 then executes the processing of loop 1 for counting an occurrence count for each action set (S103102) and the processing of loop 2 for counting an occurrence count for each action (S103103). The same label occurrence counter 1031 may execute the processing of loop 1 and the processing of loop 2 in parallel, or may execute them in order. Only any one of the processing of loop 1 and the processing of loop 2 may be executed depending on necessary information.

In the embodiment, the description will be given, assuming that the processing of loop 1 (S103102) and the processing of loop 2 (S103103) are executed in parallel.

In the processing of loop 1, the same label occurrence counter 1031 counts an occurrence count of an action set to be processed in the acquired prepared log data 108-1 (S103102). In the step, counts are counted that are stored in the fields of the total occurrence count D20206 and the occurrence document count D20207 in any table of the occurrence count table (action set) 202-b.

In the processing of loop 2, the same label occurrence counter 1031 counts an occurrence count of an action to be processed in the acquired prepared log data 108-1 (S103103). In the step, counts are counted that are stored in the fields of the total occurrence count D20202 and the occurrence document count D20203 in any table of the occurrence count table (action) 202-a.

After executing the loop 1 for all the action sets and executing the loop 2 for all the actions, the same label occurrence counter 1031 determines whether there is an entry corresponding to the label received together with the acquired prepared log data 108-1 in the main table 201 of the label occurrence DB 104 (S103104). If there is an entry corresponding to the received label (S103104: Yes), advances the processing to step S103106. On the other hand, if there is no entry corresponding to the received label (S103104: No), generates an entry corresponding to the received label in the main table 201, generates one table (table corresponding to 202-1a) of the occurrence count table (action) 202-a of the sub-table 202 referable from the entry, generates one table (table corresponding to 202-1b) of the occurrence count table (action set) 202-b, and advances the processing to step S103106 (S103105). In the generated one table (table corresponding to 202-1a) of the occurrence count table (action) 202-a and one table (table corresponding to 202-1b) of the occurrence count table (action set) 202-b, values of fields related to counts are set to initial values (0).

In step S103106, the same label occurrence counter 1031 adds the number of pieces of prepared log data 108-1 acquired to the value of the total document count D20104 of the entry corresponding to the label acquired in step S103101 of the main table 201, and further adds the counts newly counted to the respective values stored in the fields of total occurrence count D20202 and occurrence document count D20203 of the table of the occurrence count table (action) 202-a, and total occurrence count D20206 and occurrence document count D20207 of the table of the occurrence count table (action set) 202-b. This makes the label occurrence DB104 appropriately reflect the occurrence counts of the action set and actions in the prepared log data 108-1 acquired newly.

Next, the label importance database 105 will be described.

FIG. 7 is a configuration diagram of a label importance database according to an embodiment.

The label importance DB 105 stores information on importance (importance information) of each action and each action set of each known log event label. The label importance DB 105 includes two tables of an action set table 301 and an action table 302.

The action set table 301 stores importance of each action set for each log event label. In the example of FIG. 7, the action set table 301 stores an entry corresponding to each action set. The entry of the action set table 301 includes fields of action set ID D30101, action set (non-ordered) D30102, label 1 importance D30103, label 2 importance D30104, . . . , and label N importance D3010N. An accurate number of fields of the action set table 301 varies according to the total number of observed log event labels.

The action set ID D30101 stores the action set ID of the action set corresponding to the entry. The action set (non-ordered) D30102 stores the action set corresponding to the entry. The label 1 importance D30103 stores importance for a label 1 of the action set corresponding to the entry. In the case where the importance is high, if the action set corresponding to the entry is included, the event is likely to be label 1. Importance of the other fields shown below is the same. The label 2 importance D30104 stores importance for a label 2 of the action set corresponding to the entry. The label N importance D3010N stores importance for a label N of the action set corresponding to the entry.

The action table 302 stores importance of each action for each log event label. In the example of FIG. 7, the action table 302 stores an entry corresponding to each action. The entry of the action table 302 includes fields of action ID D30201, label 1 importance D30202, label 2 importance D30203, . . . , and label N importance D3020N. An accurate number of fields of the action table 302 varies according to the total number of observed log event labels.

The action ID D30201 stores action ID of the action set corresponding to the entry. The label 1 importance D30202 stores importance for the label 1 of the action corresponding to the entry. The label 2 importance D30203 stores importance for the label 2 of the action corresponding to the entry. The label N importance D3020N stores importance for the label N of the action corresponding to the entry.

Next, importance calculation processing by the label importance calculation unit 1032 will be described.

The label importance calculation unit 1032 uses the occurrence information acquired from the label occurrence DB 104 to calculate importance of each of an action and an action set for each log event label. When a change occurs in the label occurrence DB 104, the information on importance also needs to be updated. Consequently, the label importance calculation unit 1032 executes the importance calculation processing in order to update the information on importance for the label.

Figure 8:
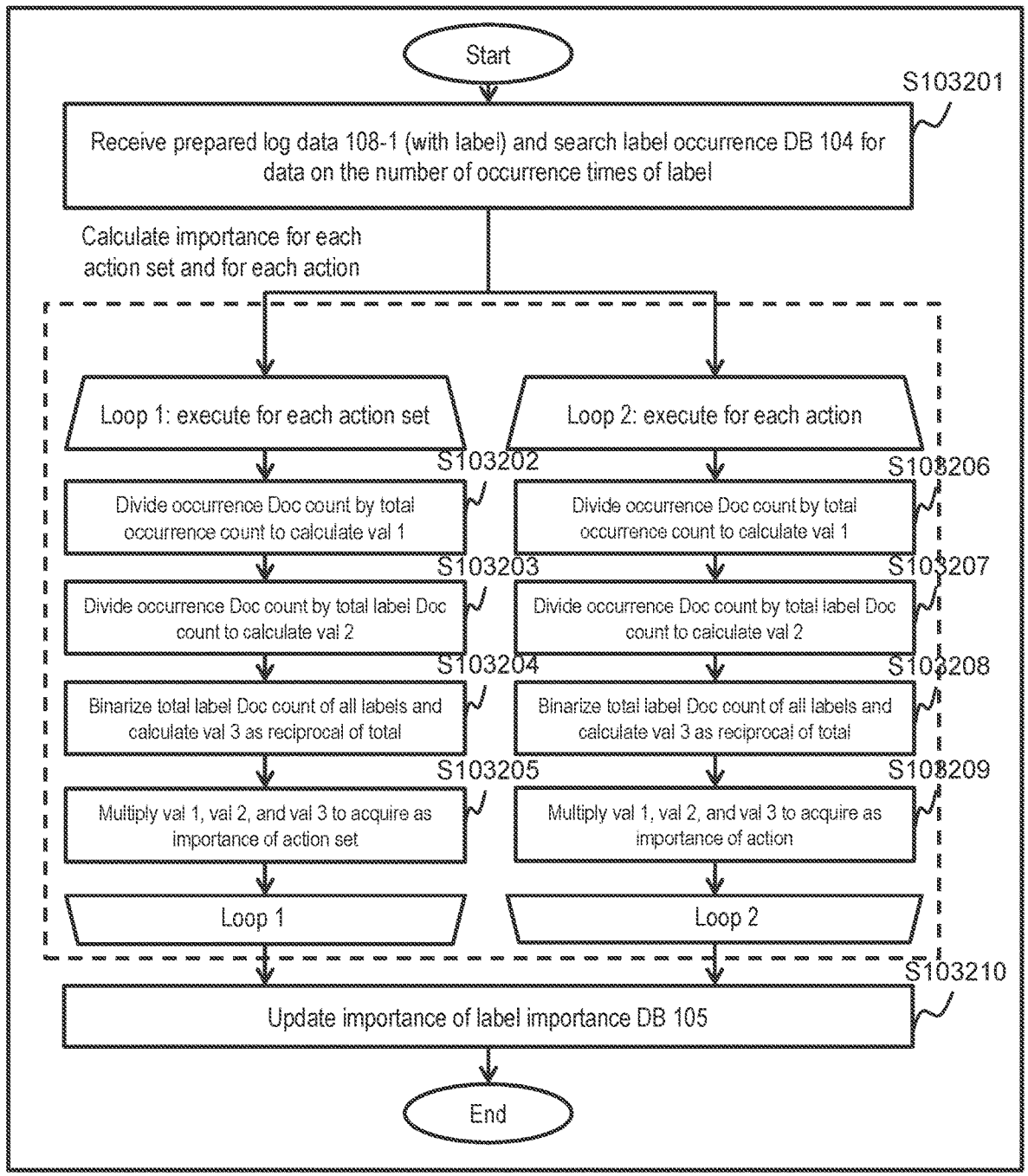
FIG. 8 is a flowchart of importance calculation processing by a label importance calculation unit according to an embodiment.

FIG. 8 is a flowchart of importance calculation processing by a label importance calculation unit according to an embodiment.

The label importance calculation unit 1032 receives the label information used in the same label occurrence counter 1031 and the prepared log data 108-1 and uses the label information to search the label occurrence DB 104 for information on an occurrence count of a label (S103201).

The label importance calculation unit 1032 then executes the processing of loop 1 (S103202-S103205) for calculating importance for each action set and the processing of loop 2 (S103206-S103209) for calculating importance for each action. The label importance calculation unit 1032 may execute the processing of loop 1 and the processing of loop 2 in parallel, or may execute them in order. Only one of the processing of loop 1 and the processing of loop 2 may be executed depending on necessary information.

In the embodiment, the description will be given, assuming that the processing of loop 1 and the processing of loop 2 are executed in parallel.

In the loop 1, the label importance calculation unit 1032 acquires an occurrence document count from the occurrence document count D20207 of an entry corresponding to an action set to be processed in a table (table corresponding to 202-1b) of the sub-table 202-b of the label occurrence DB 104 corresponding to the label (specific label) received in step S103201, divides the occurrence document count by a total occurrence count acquired from the total occurrence count D20206 of the entry, and thereby acquires a variable val 1 (S103202).

The label importance calculation unit 1032 then divides the occurrence document count acquired in step S103202 by a total label document count acquired from the total label document count D20104 of the entry corresponding to the specific label of the main table 201, and thereby acquires a variable val 2 (S103203).

The label importance calculation unit 1032 then acquires a total label document count from the total label document count D20104 of the entry of each label of the main table 201, executes binary conversion in which if each total document label count is one or more, it is converted into 1, and if it is 0, it remains 0, finds totals values acquired for all the labels after execution of binary conversion, finds a reciprocal of the total value, and thereby acquires a val 3 (S103204).

The label importance calculation unit 1032 then acquires a result of multiplication of the val 1, val 2, and val 3 as importance of the action set in the specific label (S103205).

In the loop 2, the label importance calculation unit 1032 acquires an occurrence document count from the occurrence document count D20203 of an entry corresponding to an action to be processed in a table of the sub-table 202-a of the label occurrence DB 104 corresponding to the label (specific label) received in step S103201, divides the occurrence document count by a total occurrence count acquired from the total occurrence count D20202 of the entry, and thereby acquires a variable val 1 (S103206).

The label importance calculation unit 1032 then divides the occurrence document count acquired in step S103206 by a total label document count acquired from the total label document count D20104 of the entry corresponding to the specific label of the main table 201, and thereby acquires a variable val 2 (S103207).

The label importance calculation unit 1032 then acquires a total label document count from the total label document count D20104 of the entry of each label of the main table 201, executes binary conversion in which if each total document label count is one or more, it is converted into 1, and if it is 0, it remains 0, finds totals values acquired for all the labels after execution of binary conversion, finds a reciprocal of the total value, and thereby acquires a val 3 (S103208).

The label importance calculation unit 1032 then acquires a result of multiplication of the val 1, val 2, and val 3 as importance of the action in the specific label (S103209).

After executing the loop 1 for all the action sets as targets and executing the loop 2 for all the actions as targets, the label importance calculation unit 1032 stores the newly acquired importance in the label importance DB 105 (S103210).

Specifically, in the action set table 301 and the action table 302 of the label importance DB 105, if there are fields of importance (D30103, . . . , D3010N, D30202, . . . , D3020N) corresponding to a target label, the label importance calculation unit 1032 updates the importance of the fields to the newly acquired (calculated) values. On the other hand, in the action set table 301 and the action table 302 of the label importance DB 105, if there are no fields of importance corresponding to the target label, the label importance calculation unit 1032 adds columns of importance corresponding to the target label to the action set table 301 and the action table 302, and stores the newly acquired importance in fields of the columns.

By this processing, the importance stored in the label importance DB 105 is used in the test phase for calculating similarity between the log stream data 14 and the specific label. Data structure, log processing, and the like necessary in the test phase will be described below.

FIG. 9 is a configuration diagram of a similarity database according to an embodiment.

The similarity DB 107 stores information on similarity between log stream data 14 observed from the device 11 and all log event labels learned by the log labeling apparatus 10.

The similarity DB 107 includes a main table 401 and a sub-table 402 (402-1a to 402-Nn).

The main table 401 stores a pointer to the sub-table 402 that manages similarity for each label of each device at a latest time step (t) and time steps in past n times ("n" is any integer).

The main table 401 stores an entry corresponding to each device. The entry of the main table 401 includes fields of device ID D40101, sub-table (time step t) D40102, sub-table (time step t-1) D40103, . . . , and sub-table (time step t-n) D4010N.

The device ID D40101 stores identification information (device ID) on a device 11 to be observed in the log stream data 14. The sub-table (time step t) D40102 stores a pointer to the sub-table 402 that manages similarity at the time step t of the device 11 corresponding to the entry. The sub-table (time step t-1) D40103 stores a pointer to the sub-table 402 that manages similarity at the time step t-1 (time step immediately preceding the time step t) of the device 11 corresponding to the entry. In the same manner, the sub-table (time step t-n) D4010N stores a pointer to the sub-table 402 that manages similarity at the time step t-n of the device 11 corresponding to the entry.

The sub-table 402 (402-1a to 402-Nn) is a plurality of tables that store, at each time step for each device, each label, relevance, an action set (accumulated action set) taken over from the past (for example, an immediately preceding time step) when it is considered to be equivalent to the label, and the like. Each table manages information such as similarity at a certain time step of a certain device.

In the embodiment, a table that manages information on similarity at the time step t of a device 11 whose device ID is 1 is referred to as sub-table 402-1a, a table that manages information on similarity at the time step t-n of the device 11 whose device ID is referred to 1 as sub-table 402-1n, a table that manages information on similarity at the time step t of a device 11 whose device ID is referred to N as sub-table 402-Na, and a table that manages information on similarity at the time step t-n of the device 11 whose device ID is referred to N as sub-table 402-Nn.

One table of the sub-table 402 stores a plurality of entries corresponding to respective labels. An entry of the sub-table 402 includes fields of label ID D40201, first similarity D40202, second similarity D40203, accumulated action set ID D40204, and used similarity D40205.

The label ID D40201 stores label ID that identifies a label. The first similarity D40202 stores a first similarity (short-term similarity). The first similarity is similarity calculated on the basis of prepared log data 108-2 observed at a specific time step (time step to which the sub-table 402 corresponds) and importance information (label importance data) between a label and an action set acquired from the label importance DB 105 at a specific device (device to which the sub-table 402 corresponds), and is similarity in a short-term perspective only taking log data at the specific time step into consideration.

The second similarity D40203 stores a second similarity (long-term similarity). The second similarity is similarity calculated on the basis of prepared log data 108-2 observed at a specific time step (time step to which the sub-table 402 corresponds), an action set of the accumulated action set ID from a time step in the past (for example, immediately before), and importance information between a label and an action set acquired from the label importance DB 105 at a specific device (device to which the sub-table 402 corresponds), and is similarity in a long-term perspective taking log data in the past into consideration.

The accumulated action set ID D40204 stores an action set ID (accumulated action set ID: action set information) indicating an action set (first action set) used to calculate the second similarity at a time step next to the specific time step. The accumulated action set ID is determined by the accumulation determination unit 1062. The used similarity D40205 stores the similarity used when the label was determined. The similarity is determined by processing by the accumulation determination unit 1062.

Next, label identification processing by the accumulation similarity calculation unit 106 will be described.

The accumulation similarity unit 106 executes label identification processing for recognizing similarity between a log event label and the log stream data observed from the device 11 and determining an event closest to an event that is currently occurring at the device 11 being observed by the log labeling apparatus 10.

Figure 10:
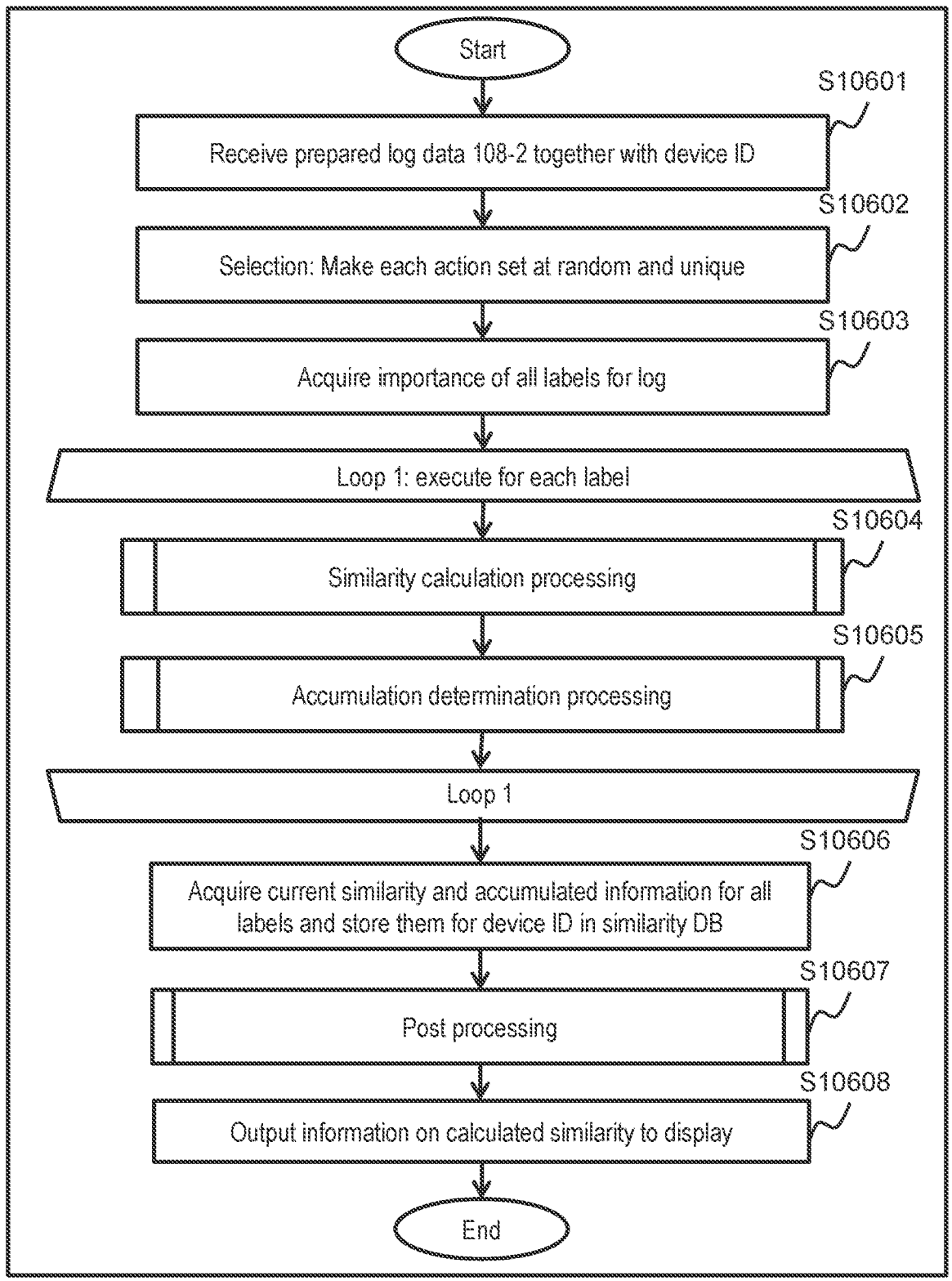
FIG. 10 is a flowchart of label identification processing by an accumulation similarity calculation unit according to an embodiment.

FIG. 10 is a flowchart of label identification processing by an accumulation similarity calculation unit according to an embodiment.

The label identification processing includes steps (S10601-S10603) of preparing all of necessary data, steps (S10604 and S10605) of calculating similarity between a label and prepared log data 108-2 for each label, and post processing steps (S10606-S10608) of handling information on the acquired similarity information for each label.

First, the accumulation similarity calculation unit 106 receives prepared log data 108-2 which needs a label recognized together with device ID (S10601). The accumulation similarity calculation unit 106 may selectively execute processing for arranging action sets of the prepared log data 108-2 in order, making them at random and unique, or including a repeated action in an action set (S10602). By the above steps, the entire configuration of the log labeling apparatus 10 is completed.

The accumulation similarity calculation unit 106 then searches the label importance DB 105 for importance of labels of all action set IDs and action IDs included in the prepared log data 108-2 (S10603).

The accumulation similarity calculation unit 106 then executes the processing of loop 1 (S104604 and S10605) for each label.

In the loop 1, the accumulation similarity calculation unit 106 causes a similarity calculation unit 1061 to execute similarity calculation processing (see FIG. 11) (S10604). In the similarity calculation processing, similarity between the labels and the prepared log data 108-2 acquired after step S1062 is calculated using the information on importance prepared in step S10603.

The accumulation similarity calculation unit 106 then uses the similarity acquired in S10604 to execute accumulation determination processing (see FIG. 12) for determining whether to continue accumulation of action sets identified from the prepared log data from the device at current and past time steps (S10605). The accumulation determination processing is mainly executed by the accumulation determination unit 1062.

The accumulation similarity calculation unit 106 then stores similarity acquired for all the labels and accumulated information determined by the accumulation determination processing in the similarity DB 107 for target device ID (S10606).

Here, the accumulation similarity calculation unit 106 generates and adds a table corresponding to a new time step of device ID to the sub-table 402, and adds a pointer to the added sub-table in a similarity table D40102 corresponding to the latest time step in the main table 401. In addition, the accumulation similarity calculation unit 106 stores the acquired similarity (first similarity and second similarity) in the first similarity D40202 and the second similarity D40203 of the newly added sub-table 402. Furthermore, the accumulation similarity calculation unit 106 stores a new accumulated action set of each label ID acquired by the accumulation determination unit 1062 in the accumulated action set ID D40204 of the sub-table 402. The accumulation similarity calculation unit 106 stores the similarity used to determine whether to accumulate the accumulated action set in the used similarity D40205 of the sub-table 402.

The post processor 1063 then executes post processing (see FIG. 13) using all label similarity for recognizing a potential most similar log event label, for example, when some log event labels indicate an increase in similarity (S10607).

The post processor 1063 then displays information on the calculated similarity on the display 12 so that, for example, an operator who needs to know when a log event occurred in the device 11 can monitor. Further details of a display example of a screen on the display 12 will be described later with reference to FIG. 14.

Next, the similarity calculation processing by the similarity calculation unit 1061 will be described.

Figure 11:
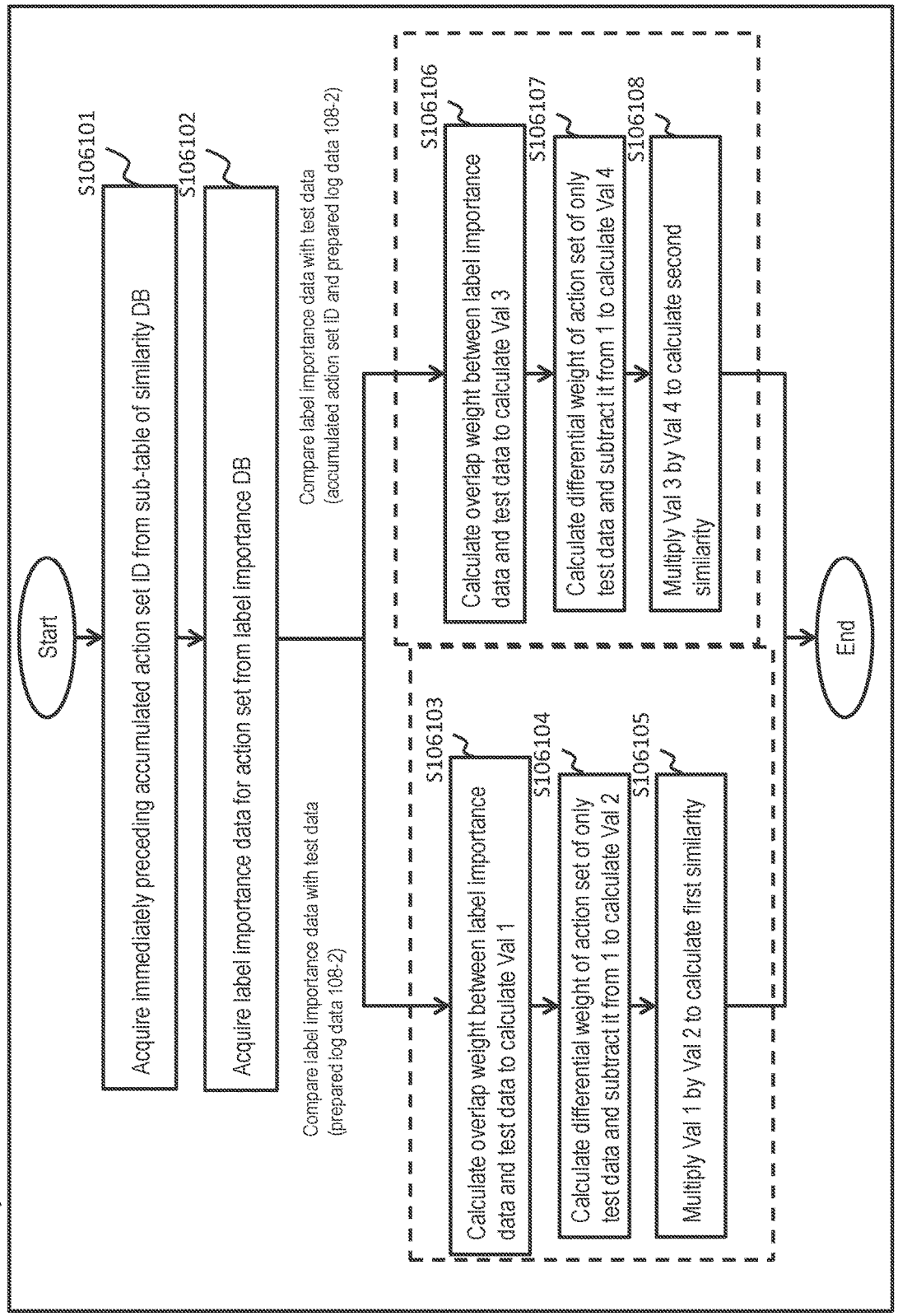
FIG. 11 is a flowchart of similarity calculation processing by a similarity calculation unit according to an embodiment.

FIG. 11 is a flowchart of similarity calculation processing by a similarity calculation unit according to an embodiment.

In the embodiment, label ID is passed from the accumulation similarity calculation unit 106 and the similarity calculation unit 1061 calculates similarity using an action set for the label. In the embodiment, although only the calculation of similarity of action sets including a plurality of actions is considered, the present invention is not limited to this, and the calculation of similarity can be performed by the same approach even for action sets including one action. In order to calculate similarity, an additional step of considering information on actions and action sets may be added to the processing by the similarity calculation unit 1061.

The similarity calculation unit 1061 acquires the accumulated action set ID of a log unit at an immediately preceding time step from the sub-table 402 of the immediately preceding time step (time step t-1) of the similarity DB 107 (S106101). The accumulated action set ID can be acquired from the accumulated action set ID D40204 of the sub-table 402 of the time step t-1.

The similarity calculation unit 1061 then acquires label importance data (importance for labels) for all action sets whose similarity is larger than 0 from the action set table 301 (S106102). For example, if a label to be processed is the label 1, action set ID and importance (label importance data) of an entry whose importance of the label 1 importance D30103 of the action set table 301 is equal to or larger than 0 are acquired.

The similarity calculation unit 1061 then executes processing for calculating the first similarity (S106103-S106105) and processing for calculating the second similarity (S106106-S106108). In the embodiment, for example, the processing for calculating the first similarity and the processing for calculating the second similarity are executed in parallel, the processing may be executed in order.

In the processing for calculating the first similarity (steps S106103-S106105), the similarity (first similarity) is calculated based on label importance data on a specific label and newly-received prepared log data 108-2 (first log unit) for device ID.

Specifically, the similarity calculation unit 1061 calculates the degree of overlap (overlap weight) between an action set included in the label importance data and an action set included in the prepared log data 108-2, and sets it as a variable Val 1 (S106103).

For example, the similarity calculation unit 1061 acquires importance for a specific (target) log event label of all action sets included in the prepared log data 108-2 from the action set table 301 of the label importance DB 105, divides the total of the importance by the total of all the importance of the target log event label stored in the action set table 301 of the label importance DB 105, and thereby calculates the overlap weight.

In order to calculate the overlap weight, the importance from the label importance DB 105 and additional information, for example, length of each action set may be used. In this case, before totaling all the values, relevant importance may be multiplied by the length of each action set and its result may be used.

The similarity calculation unit 1061 calculates a differential weight between an action set for a specific (target) log event label included in the prepared log data 108-2 but not included in the label importance data and the total amount of action sets included in the prepared log data 108-2, subtracts the differential weight from 1, and sets its result as a variable Val 2 (S106104).

The similarity calculation unit 1061 then calculates the first similarity by multiplying the variable Val 1 by the variable Val 2 (S106105).

In the processing for calculating the second similarity (steps S106106-S106108), the similarity (second similarity) is calculated based on the importance data on the specific label, the newly-received prepared log data 108-2 for the device ID, and information based on the past log data (accumulated action set ID acquired from the similarity DB 107).

Specifically, the similarity calculation unit 1061 calculates the degree of overlap (overlap weight: first value) between the action set included in the label importance data on the specific label and an action set included in the prepared log data 108-2 and an action set of the accumulated action set ID of the accumulated action set ID D40204 of the sub-table, and sets it as a variable Val 3 (S106106).

For example, the similarity calculation unit 1061 acquires importance for a specific (target) log event label of all action sets included in the prepared log data 108-2 and the accumulated action set ID from the action set table 301 of the label importance DB 105, divides the total of the importance by the total of all the importance of the target log event label stored in the action set table 301 of the label importance DB 105, and thereby calculates the overlap weight.

In order to calculate the overlap weight, the importance from the label importance DB 105 and additional information, for example, length of each action set may be used. In this case, before totaling all the values, relevant importance may be multiplied by the length of each action set and its result may be used.

The similarity calculation unit 1061 then calculates a differential weight between an action set of the specific (target) log event label included in the prepared log data 108-2 and the accumulated action set ID but not included in the label importance data and the total amount of action sets included in the prepared log data 108-2 and the action set of the accumulated action set ID, subtracts the differential weight from 1, and sets its result as a variable Val 4 (second value) (S106107).

The similarity calculation unit 1061 then calculates the second similarity by multiplying the variable Val 3 by the variable Val 4 (S106108).

Next, accumulation determination processing by the accumulation determination unit 1062 will be described.

The accumulation determination unit 1062 determines whether the action set ID included in the observed prepared log data 108-2 should be accumulated for use in the calculation processing of similarity of succeeding log data by recognizing whether an action set of the accumulated action set ID of the past (immediately preceding time step) from the device 11 and an action set newly observed at this time step included in the prepared log data 108-2 have the same log event label.

Figure 12:
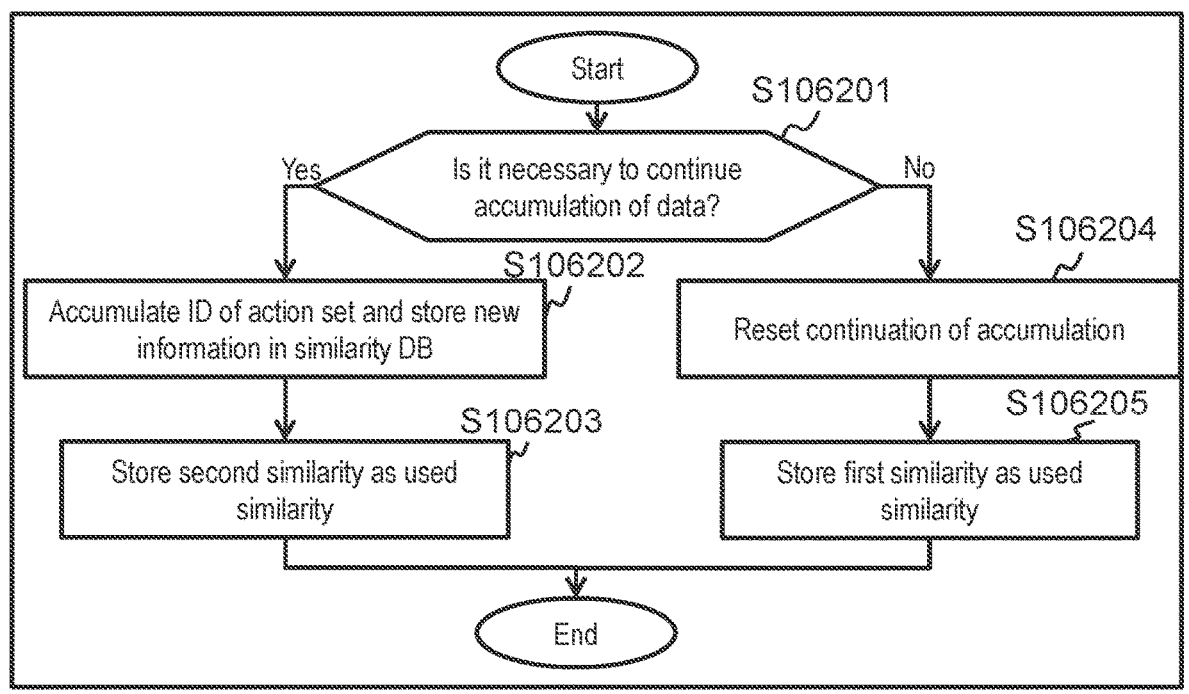
FIG. 12 is a flowchart of accumulation determination processing by an accumulation determination unit according to an embodiment.

FIG. 12 is a flowchart of accumulation determination processing by an accumulation determination unit according to an embodiment.

The accumulation determination unit 1062 determines whether it is necessary to continue accumulation of action sets on the basis of a predetermined rule regarding the similarity (first similarity and second similarity) acquired from the similarity calculation unit 1061 (S106201).

As the predetermined rule, there are cases, for example, when both first similarity and second similarity are 0, when the second similarity is smaller than the first similarity, and the current (time step t) second similarity is smaller than the immediately preceding (time step t-1) second similarity, these cases mean that a log unit being currently processed (first log unit) is low in similarity to a log unit immediately before, therefore it is determined that it is not necessary to continue accumulation of action sets. Note that the immediately preceding second similarity can be acquired from the second similarity D40203 of the sub-table 402 corresponding to the immediately preceding time step.

As a result, if it is determined that it is necessary to continue accumulation of the action set (S106201: Yes), the accumulation determination unit 1062 adds the action set ID of the action set included in the prepared log data 108-2 to the accumulated action set ID of the immediately preceding time step, and stores the accumulated action set ID after addition (action set information identifying a second action set) in the accumulated action set ID D40204 of the sub-table 402 corresponding to the current time step (S106202). The accumulated action set ID stored in the accumulated action set ID D40204 of the sub-table 402 corresponding to the current time step is used for calculation of the second similarity of the log unit (second log unit) at the next time step. Here, the addition of the action set ID is performed according to accumulation configuration of the action set. For example, as the accumulation configuration, there is, when the action set is added, configuration of whether the action set ID is ordered or not ordered, or whether repetition is included or excluded regarding the same action set.

The accumulation determination unit 1062 then stores the second similarity as similarity indicating a current potential belonging to the specific log event label of the log stream data observed from the device 11 in the used similarity D40205 of the sub-table 402 of the similarity DB 107 (S106203).

On the other hand, if it is determined that it is not necessary to continue accumulation of the action set (S106201: No), the accumulation determination unit 1062 resets the continuation of accumulation of the accumulated action set ID, that is, does not include content of the immediately preceding accumulated action set ID (S106204). Here, in the embodiment, as a method for resetting the continuation of accumulation, if the first similarity is 0, the accumulation determination unit 1062 stores an empty set in the accumulated action set ID D40204 of the sub-table 402 of the similarity DB 107, and if the first similarity is other than 0, it stores the action set ID of the prepared log data 108-2 to be processed in the accumulated action set ID D40204 of the sub-table 402 of the similarity DB 107.

The accumulation determination unit 1062 then stores the first similarity as similarity indicating the current potential belonging to the specific log event label of the log stream data observed from the device 11 in the used similarity D40205 of the sub-table 402 of the similarity DB 107 (S106205).

Next, post processing by the post processor 1063 will be described.

The post processor 1063 executes the post processing on the basis of the accumulation result and the similarity result by the similarity calculation unit 1061 and the accumulation determination unit 1062. The post processing includes, for example, label recognition for determining a unique log event label when there are a plurality of increases in similarity for log stream data observed from the device 11.

Figure 13:
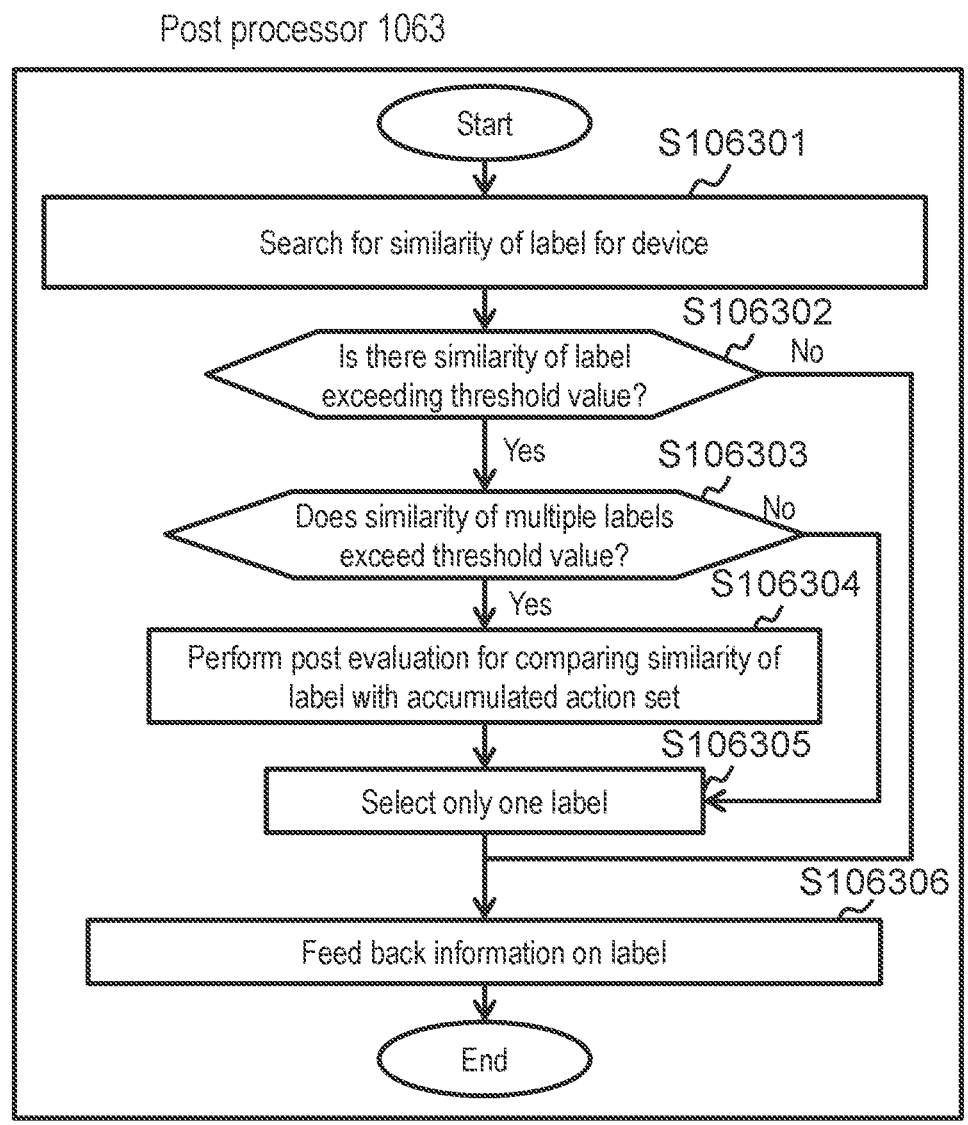
FIG. 13 is a flowchart of post processing by a post processor according to an embodiment.

FIG. 13 is a flowchart of post processing by a post processor according to an embodiment.

The post processor 1063 searches the similarity DB 107 for similarity of all the log event labels for the device 11 (S106301).

The post processor 1063 then determines whether there is similarity in the retrieved similarity of the labels that exceeds a predetermined threshold value (S106302). As a result, if there are no labels whose similarity exceeds the predetermined threshold value (S106302: No), the post processor 1063 advances the processing to step S106306. On the other hand, if there is at least one label whose similarity exceeds the predetermined threshold value (S106302: Yes), the post processor 1063 determines whether there are a plurality of labels whose similarity exceeds the threshold value (S106303).

As a result, if there are not a plurality of labels whose similarity exceeds the threshold value (S106303: No), the post processor 1063 advances the processing to step S106305. On the other hand, if there are a plurality of labels whose similarity exceeds the threshold value (S106303: Yes), the post processor 1063 performs post evaluation to determine the most likely label (S106304). As the post evaluation, for example, difference between the similarity of the label and length of accumulation of an action set corresponding to the label may be compared and evaluated.

In step S106305, the post processor 1063 selects only one label for the device on the basis of the result of the post evaluation or selects the label when it is determined that only one label exceeds the threshold value in step S106303 as only one label for the device (S106305).

The post processor 1063 then feeds back the acquired label information to make further post processing possible (S106306). For example, the post processor 1063 causes the display 12 to display a screen of a GUI including various types of information on the basis of the acquired label information.

Next, an example of screen of the GUI will be described.

Figure 14:
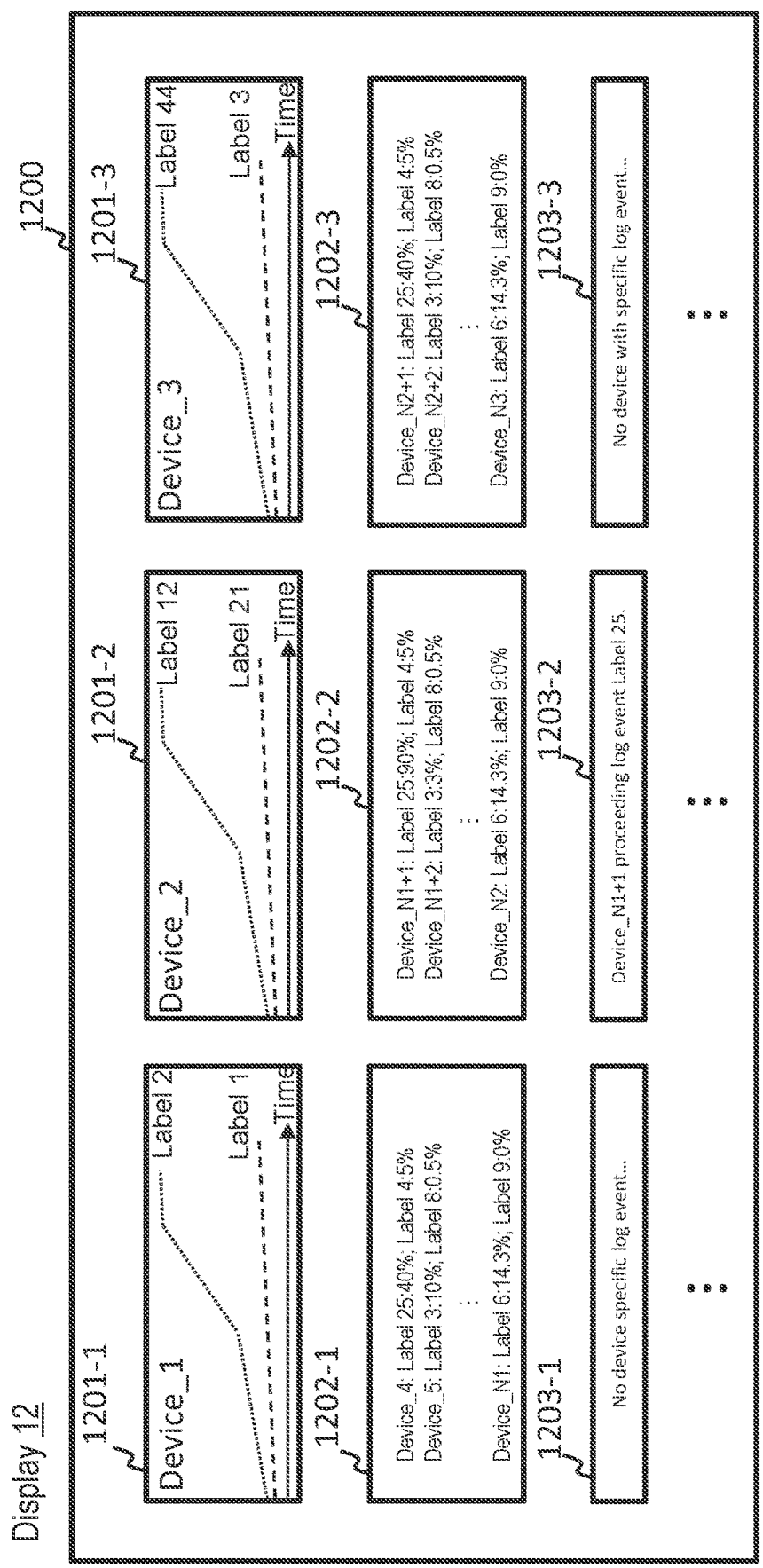
FIG. 14 is a diagram showing an example of a screen of a GUI according to an embodiment.

FIG. 14 is a diagram showing an example of a screen of the GUI according to an embodiment.

A screen 1200 displayed on the display 12 includes a similarity graph 1201 (1201-1, 1201-2, 1201-3), a device similarity list 1202 (1202-1, 1202-2, 1202-3) and a continuation log event list 1203 (1203-1, 1203-2, 1203-3).

The similarity graph 1201 shows changes in similarity for a plurality of labels for each of groups of a plurality of devices. The similarity graph 1201 allows labels suitable for log stream data of the respective devices to be visually recognized.

The device similarity list 1202 includes information on sets of the labels most suitable for the respective devices and the similarity for the labels. In the present embodiment, the device similarity list 1202 includes information on sets of other labels at one device and similarity for the labels.

In the continuation log event list 1203, information on a device about which it is recognized that its log event is in progress, is displayed. For example, in the continuation log event list 1203, device ID of the device in progress and label ID indicating its log event are displayed. The continuation log event list 1203 can provide a monitoring operator with a quick idea of which device an effort should be focused on.

Next, a hardware configuration of the log labeling apparatus 10 will be described.

Figure 15:
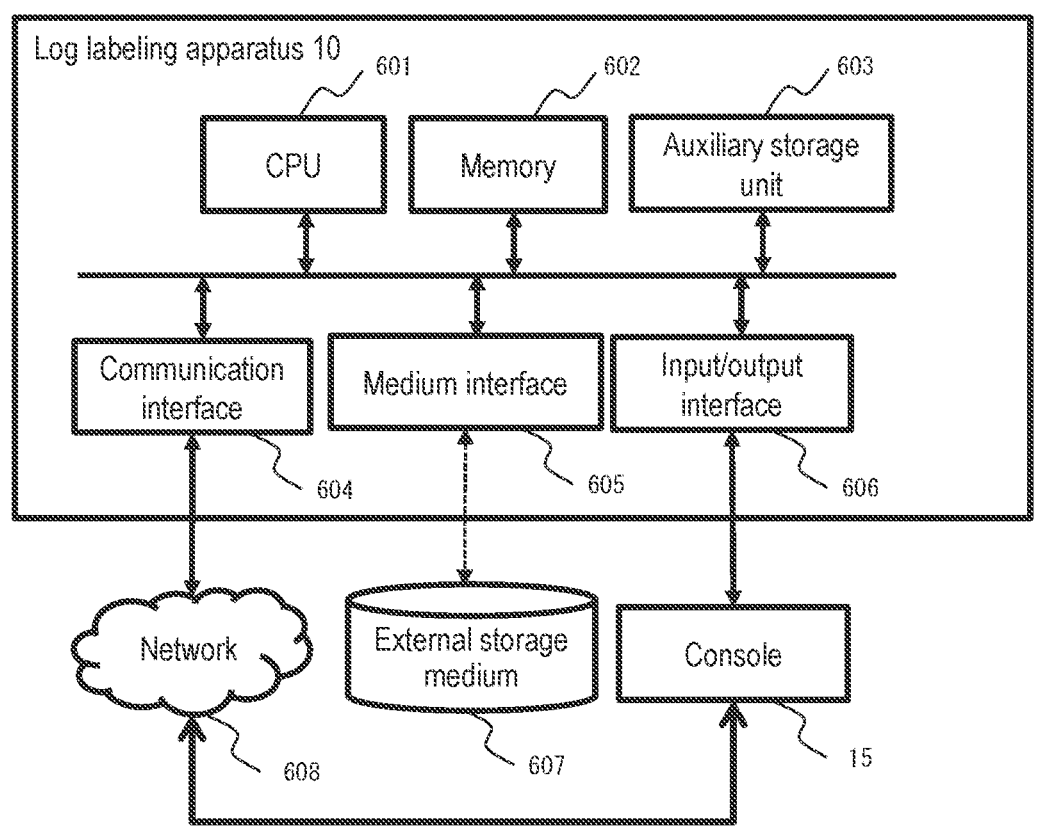
FIG. 15 is a hardware configuration diagram of a log labeling apparatus according to an embodiment.

FIG. 15 is a hardware configuration diagram of a log labeling apparatus according to an embodiment.

The log labeling apparatus 10 is, for example, a general-purpose computer, and includes a CPU (Central Processing Unit) 601, a memory 602, an auxiliary storage unit 603, a communication interface 604, a medium interface 605, and an input/output interface 606.

The CPU 601 executes programs stored in the memory 602 or auxiliary storage unit 603, uses data stored in the memory 602 or auxiliary storage unit 603, and thereby executes various types of processing. The memory 602 is, for example, a RAM (Random Access Memory) and stores programs, data, and the like executed by the CPU 601. The auxiliary storage unit 603 is, for example, a hard disk drive, flash memory, RAM, or the like, and stores programs executed by the CPU 601 and data used by the CPU 601.

The communication interface 604 is an interface for communicating with another apparatus (for example, the device 11 or a server) via a network 608. The medium interface 605 can attach and detach an external storage medium 607, and mediates input and output of data with the external storage medium 607. The input/output interface 606 is couplable to the console 15 operated by the administrator of the log labeling apparatus 10 and executes input and output of information with the console 15.

The function units (log data preprocessor 101, label management unit 103, accumulation similarity calculation unit 106, and the like) of the log labeling apparatus 10 in FIG. 1 are implemented by, for example, the CPU 601 executing a program (log analysis program) stored in the memory 602 or auxiliary storage unit 603. Information managed by the function units (action ID DB 102, label occurrence DB 104, label importance DB 105, and similarity DB 107) is stored in the memory 602 or auxiliary storage unit 603 which is one example of the storage unit.

The present invention is not limited to the above-described embodiments, and it is possible to implement appropriate modifications within a range not departing from the spirit of the present invention.

For example, although in the embodiments, the log data processing is described in which the log labeling apparatus 10 handles log event labeled data for each log event and log stream data 14 for one device or each device, the log labeling apparatus 10 may handle and process a plurality of pieces of log stream data from a plurality of devices, and may handle and process a plurality of pieces of log event labeled data at one time.

Although the embodiments show the example in which each device is one hardware device, the present invention is not limited to that, and it may be a device configured by software (VM on hardware).

In the embodiments, a group (device group) made up of a plurality of devices may be handled by one device ID, and the device group may be handled in the same manner as the above-described device.

Although, in the embodiments, the first similarity and the second similarity are calculated on the basis of the overlap weight and the value based on differential weight, the present invention is not limited to that, and, for example, at least one of the first similarity or second similarity may be calculated by the overlap weight without using the differential weight.

In the embodiments, part or all of the processing executed by the CPU may be executed by a hardware circuit. The program in the embodiments may be installed from a program source. The program source may be a program distribution server or storage medium (for example, a portable storage medium).

What is claimed is:

1. A log analysis apparatus for recognizing a label indicating a log event included in log stream data which is a plurality of pieces of log data output consecutively, comprising:
a storage configured to store importance information indicating an importance of a plurality of labels for each of a plurality of action sets each including one or more actions included in log data, and store action set information identifying a first action set used for calculating a long-term similarity which is similarity in a long-term perspective, which is greater than a short-term perspective, with each label of a first log including one or more pieces of log data at a predetermined time point;
a processor coupled to a memory storing instructions that when executed by the processor configure the processor to:
calculate the long-term similarity with each of the labels of the first log based on the importance information, an action set included in the first log at the predetermined time point, and the action set identified by the action set information;
detect label candidates corresponding to the first log based on the long-term similarity;
determine a second action set which is an action set used for calculating a long-term similarity with each label of a second log at a time point next to the predetermined time point based on the long-term similarity and to store action set information identifying the second action set in the storage; and
calculate a long-term similarity with each of the labels of the first log on the basis of a first value based on importance corresponding to each action set included in the first log of the importance information on each of the labels and each action set that matches the first action set of the action set information, and a second value based on importance corresponding to each action set included in the first log of the importance information on each of the labels and each action set that does not match the first action set of the action set information.

2. The log analysis apparatus according to claim 1, wherein
the processor is further configured to:
calculate a short-term similarity which is similarity at the short-term perspective between the first log and each of the labels based on an action set included in log data in the first log and the importance information; and
determine the second action set based on the long-term similarity and the short-term similarity.

3. The log analysis apparatus according to claim 1, further comprising:
a display configured to display information on the detected label candidates.

4. The log analysis apparatus according to claim 1, wherein
the processor is further configured to determine an optimal label for the log from the plurality of label candidates based on the long-term similarity with each of the labels.

5. The log analysis apparatus according to claim 1, further comprising:
the processor being further configured to calculate the importance information based on occurrence situations of action sets in a plurality of pieces of learning log data with label attached.

6. The log analysis apparatus according to claim 5, further comprising:
the processor being further configured to:
count occurrence times of action sets in learning log data with each label attached in the plurality of pieces of learning log data with label attached, wherein the storage is configured to store occurrence number information indicating a number of occurrence times of each action set for each of the labels; and the processor is further configured to calculate the importance information based on the occurrence number information.

7. The log analysis apparatus according to claim 1, wherein the processor is further configured to calculate the long-term similarity by multiplying the first value by the second value.

8. The log analysis apparatus according to claim 1, further comprising:

the processor being further configured to extract an action from the log data and recognize an action set included in the first log.

9. The log analysis apparatus according to claim 8, wherein the storage is configured to manage an action set ID identifying an action set; and the processor is further configured to register a new action set ID identifying an action set included in the first log in the storage when the action set ID identifying the action set included in the first log is not managed by the storage.

10. A log analysis method by a log analysis apparatus that recognizes a label indicating a log event included in log stream data which is a plurality of pieces of log data output consecutively, comprising:

storing, in a storage, importance information indicating an importance of a plurality of labels for each of a plurality of action sets each including one or more actions included in log data, and storing action set information identifying a first action set used for calculating a long-term similarity which is similarity in a long-term perspective, which is greater than a short-term perspective, with each label of a first log including one or more pieces of log data at a predetermined time point;

calculating the long-term similarity with each of the labels of the first log based on the importance information, an action set included in the first log at the predetermined time point, and the action set identified by the action set information;

detecting label candidates corresponding to the first log based on the long-term similarity; and determining a second action set which is an action set used for calculating a long-term similarity with each label of a second log at a time point next to the predetermined time point based on the long-term similarity and storing action set information identifying the second action set in the storage, wherein the similarity calculation is configured to calculate a long-term similarity with each of the labels of the first log on the basis of a first value based on importance corresponding to each action set included in the first log of the importance information on each of the labels and each action set that matches the first action set of the action set information, and a second value based on importance corresponding to each action set included in the first log of the importance information on each of the labels and each action set that does not match the first action set of the action set information.

11. A non-transitory computer readable medium storing a log analysis program to be executed by a computer implementing a log analysis apparatus that recognizes a label indicating a log event included in log stream data which is a plurality of pieces of log data output consecutively, wherein in a state in which a storage has stored importance information indicating an importance of a plurality of labels for each of a plurality of action sets each including one or more actions included in log data for a plurality of labels, and has stored action set information identifying a first action set used for calculating a long-term similarity which is similarity in a long-term perspective, which is greater than a short-term perspective, with each label of a first log including one or more pieces of log data at a predetermined time point;

the log analysis program is configured to cause the computer to execute the steps of:

calculating the long-term similarity with each of the labels of the first log based on the importance information, an action set included in the first log at the predetermined time point, and the action set identified by the action set information;

detecting label candidates corresponding to the first log based on the long-term similarity;

determining a second action set which is an action set used for calculating a long-term similarity with each label of a second log at a time point next to the predetermined time point based on the long-term similarity and to store action set information identifying the second action set in the storage; and calculating a long-term similarity with each of the labels of the first log on the basis of a first value based on importance corresponding to each action set included in the first log of the importance information on each of the labels and each action set that matches the first action set of the action set information, and a second value based on importance corresponding to each action set included in the first log of the importance information on each of the labels and each action set that does not match the first action set of the action set information.

* * * * *